US012565974B2

(12) United States Patent
Frenehard et al.

(10) Patent No.: US 12,565,974 B2
(45) Date of Patent: Mar. 3, 2026

(54) LIGHTING MODULE WITH INTERCONNECTED PCB ASSEMBLIES

(71) Applicant: VALEO VISION, Bobigny (FR)

(72) Inventors: Romain Frenehard, Bobigny (FR); Pierre Placais, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/841,491

(22) PCT Filed: Mar. 1, 2023

(86) PCT No.: PCT/EP2023/055189
§ 371 (c)(1),
(2) Date: Aug. 26, 2024

(87) PCT Pub. No.: WO2023/166062
PCT Pub. Date: Sep. 7, 2023

(65) Prior Publication Data

US 2025/0172266 A1 May 29, 2025

(30) Foreign Application Priority Data

Mar. 1, 2022 (EP) .................................... 22159320

(51) Int. Cl.
*F21S 41/19* (2018.01)
*F21S 45/47* (2018.01)

(52) U.S. Cl.
CPC ............ *F21S 41/192* (2018.01); *F21S 45/47* (2018.01)

(58) Field of Classification Search
CPC ....... F21S 41/19–192; F21S 43/19–195; F21S 45/47–48; H05K 1/05–181;
(Continued)

(56) References Cited

U.S. PATENT DOCUMENTS 7,832,913 B2 * 11/2010 Biarne .................. F21S 43/195 362/547
8,602,593 B2 12/2013 Markle et al.
(Continued)

FOREIGN PATENT DOCUMENTS

EP 2197047 A1 6/2010
EP 3389189 A1 10/2018

OTHER PUBLICATIONS

European Patent Office, International Search Report and Written Opinion of corresponding International Application No. PCT/EP2023/055189, dated May 12, 2023.

*Primary Examiner* — Jason M Han
(74) *Attorney, Agent, or Firm* — Valeo Vision

(57) ABSTRACT

The present invention relates to an automotive lighting module able to perform front lighting functions. The lighting module includes at least a first Printed circuit board assembly (PCBA) mounted with at least one light source, a heat sink adapted to dissipate heat, at least a second PCBA, where at least the first PCBA is supported by the heat sink; and one or more reflectors. The first PCBA and the second PCBA are interconnected by an elastic connector which is elastically deformable. A first end of the elastic connector is fixed to the first PCBA, and a second end is adapted to be pressed against a contact zone of the second PCBA by elastic deformation of the elastic connector, to establish the connection between the first PCBA and the second PCBA.

15 Claims, 8 Drawing Sheets

(58) Field of Classification Search
CPC . H05K 3/0058–0061; H05K 3/36–368; H05K 2201/0302–0311; H05K 2201/10106; H05K 2201/10121
See application file for complete search history.

(56) References Cited

U.S. PATENT DOCUMENTS

| | | | | |
|---|---|---|---|---|
| 10,113,705 | B2 * | 10/2018 | Yoon | F21S 41/151 |
| 2014/0218954 | A1 | 8/2014 | Yoon et al. | |

* cited by examiner

LIGHTING MODULE WITH INTERCONNECTED PCB ASSEMBLIES

TECHNICAL FIELD

The present invention relates to lighting modules in vehicle lamps and particularly relates to interconnection of PCB assemblies in the automotive lighting modules.

BACKGROUND OF THE INVENTION

A printed circuit board, or PCB, is used to mechanically support and electrically connect electronic components using conductive pathways, or traces, etched from copper sheets laminated onto a non-conductive substrate. PCBs are widely used in different industries as a technique for reducing the cable wiring between electronic components, reducing the size and weight of the device, and improving the reliability. A PCB populated with electronic components is known as a printed circuit board assembly (PCBA). The PCBs are often populated with power components such as Light Emitting Diodes (LEDs) or any other semiconductor devices. The PCBs are often referred to as a light source support or substrates.

In automotive vehicle lamps, more than a single PCB may be required to be used to accommodate different electronic components and corresponding control circuitry etc., and hence, it is required to electrically connect the PCBs.

For instance, in conventional vehicle lighting modules, drive circuits and control circuits are arranged outside a lighting module and connected to a PCB of a lighting module using a wiring harness. This is expensive and requires more space in the lighting module. However, in some compact lighting modules, the drive and control circuits have to be arranged on a PCB with high thermal dissipation characteristics, such as Insulated Metal Substrate (IMS) PCB. This kind of PCB generally comprises a single usable layer of copper on its surface, which makes it complex and/or costly to arrange drive and control circuitry on an IMS PCB. A connection allowing to connect an IMS PCBA to another type of PCBA is therefore sought.

One conventional technique to electrically and physically connect the two PCBs is by using a wiring harness. However, adding a wiring harness to connect the two PCBs is expensive and requires more space to accommodate connectors, which are often bulky, and wires. With the demand in the miniaturization of vehicle lamps and also due to optical and mechanical constraints in the vehicle lamps, it may be required to connect the PCBs by different means that takes less space in the vehicle lamps. Further, the cost of wiring harnesses increases with the increase in the number of PCBs to be connected. In addition, the use of a wiring harness is complex as it implies a complex assembly step. This complexity leads to reproducibility problems of the harness assembly, which can be a source of Electromagnetic Compatibility (EMC) and other quality problems. Furthermore, the harness is bulky and may therefore penalise the product packaging. Thus, interconnecting PCBs using conventional means such as wiring harnesses extracts a penalty in terms of space, volume, cost, complexity and labour required to build the assembly. In particular, modern headlamps have to fit into depth and height constraints that are not achievable with wire harnesses. Depth is typically measured along a main axis of progression of a vehicle on which the module is designed to be mounted; for functions such as low beam and high beam, it is closely related to the main optical axis in which the module is designed to project light. Height is typically measured along a vertical axis of a vehicle on which the module is designed to be mounted.

Other techniques to connect the PCBs include rigid connectors, that is to say connectors not including wires, such as plug and socket connectors, card edge connectors and the like. In these techniques, a connector is mounted on each PCB and adapted to mate with another such connector mechanically and electrically. Due to their rigidity, these connectors create positioning constraints and requires additional labour for assembly; moreover, such rigid connectors favour mechanical stress due to vibrations during the operation of the vehicle. Therefore, rigid connectors create design constraints leading to increased cost, bulk and complexity. In particular, such connectors may lead to complex assembly processes implying reliability risks and increased cost.

While connecting the two PCBs, it is also required to dissipate effectively heat generated from electronic or electric components mounted on the PCBs. In particular, the PCBs that are used for front lighting functions (for example: low beam function, high beam function, matrix beam and pixel beam functions etc.) carry high-powered electronic components and generate more heat and hence it is required to effectively dissipate heat, while ensuring proper connection between the PCBs.

These problems are most salient in the context of automotive lighting modules designed for high performance front lighting functions, including high beam, low beam, and segmented high beam functions such as Matrix beam and Pixel beam. As a reference, low performance front lighting functions typically include Daytime Running Light (DRL), Position Light (PL) and Turn Indicator (TI).

Further, any one of PCBs may be mounted directly to the heat sink in order to improve the thermal performance of the lighting module, especially when said PCBA includes light sources. In particular, for high performance front lighting functions, the power rating of light sources is generally high, compared with the light sources used for low performance lighting functions. Such an assembly occupies the face of the PCBA opposed to the face of the PCB on which the light sources are located, making it unavailable for the implantation of a connector, and creates a constraint for the position of a connector on the PCBA, which is very advantageously solved by the use of the at least one elastic connector.

Further, reflectors are typically at least partially indexed and/or mounted on any one of the PCBs, so that they are accurately adjusted over the light sources of said PCBA, hence resulting in improved optical performance. Such an assembly occupies a great part of the face of the PCB on which the light sources are located unavailable for connection purposes, and creates an additional constraint for the position of a connector on the PCBA, which is very advantageously solved by the use of the at least one elastic connector.

It would be advantageous if a system were devised that would completely eliminate the need for wiring harness and conventional connectors, and still provide an electrical interconnection between the PCBs, in particular in the context of a high performance lighting module.

SUMMARY OF THE INVENTION

An object of the present invention is to provide a vehicle lighting module in which PCBs are interconnected by a mechanism which eliminates the need for wiring harness and conventional connectors, and still provide a mechanical and electrical interconnection between the PCBs, while meeting thermal and optical constraints, and as well as Electromagnetic Compatibility (EMC) constraints of the vehicle lighting device.

Other object of the present invention is to provide a mechanism that allows to automate the assembly of PCBs in the vehicle lighting device.

Another object of the present invention is to provide a mechanism to connect PCBs which is less complex, less expensive and requires less space in the lighting module, and thereby in the vehicle lighting device.

According to an embodiment of the present invention, there is provided an automotive lighting module able to perform a front lighting function, the automotive lighting module comprises:

- at least a first Printed circuit board assembly (PCBA) mounted with at least one light source;
- a heat sink adapted to dissipate heat generated by the at least one light source; at least a second Printed circuit board assembly (PCBA), wherein the at least the first PCBA and/or the at least the second PCBA is supported by the heat sink; and
- one or more reflectors arranged to reflect the light emitted by the at least one light source.

According to the invention, the first PCBA (105) and the second PCBA (110) are interconnected by at least one elastic connector (115) comprising a first end (120) and a second end (125) opposite to the first end (120), which is elastically deformable, wherein the first end (120) of the elastic connector (115) is fixed to the first PCBA (105) or the second PCBA (110), and the second end (125) is adapted to be pressed against a contact zone (135) of, respectively, the second PCBA (110) or the first PCBA (105), by elastic deformation of the elastic connector (115), so as to engage the second end (125) to the contact zone (135) and, thereby, establish the connection between the first PCBA (105) and the second PCBA (110).

In other words, the first end of the at least one elastic connector is fixed to one of the first PCBA or second PCBA, and the second end is pressed against a contact zone of the other of the first or second PCBA, by elastic deformation of the at least one elastic connector.

Thus, in accordance with the present invention, the PCBAs are connected by the at least one elastic connector and eliminates the need of a wiring harness. Therefore, the connection between the PCBAs using the at least one elastic connector is less complicated, less expensive and takes less space. Further, a greater number of PCBAs can be connected using elastic connectors with lesser costs compared to the wiring harness, which is expensive. Hence, manufacturing cost of lighting modules which employ a greater number of PCBAs can be minimized by the use of elastic connectors to interconnect them. By way of an example, and not limitation, lighting modules such as thin lighting modules, multiple function lighting modules, and the like, require a greater number of PCBAs to be accommodated in minimum space, and hence for such modules, the manufacturing cost can be substantially reduced by connecting the PCBAs using the elastic connectors. Therefore, the PCBAs connected by the at least one elastic connector require less space compared to PCBAs connected by the wiring harness, and hence remaining space can be used to arrange other components of the lighting modules.

Furthermore, the elastic connection enables the automation of assembly of PCBs in the lighting module, thereby enabling easier manufacturing of lighting devices and also reduces the risk of failure during the operation and maintenance. This can also reduce the number of processing steps and thereby the assembly costs. In addition, the elastic connectors themselves establish a reliable connection between two PCBs, and hence no additional components are required to connect the PCBs.

In addition, the compactness and thermal performance of the lighting module can be improved by the use of the elastic connection between the PCBAs. For instance, a first PCBA can be connected to a second PCBA by means of elastic connectors, wherein the first PCBA includes an Insulated Metal Substrate (IMS) PCB which is adapted to the high thermal dissipation needs of an electroluminescent light source. Such a PCBA is called an IMS PCBA. Meanwhile the second PCBA includes a Flame Retardant glass fiber epoxy (FR4) PCB, which can accommodate a higher connection density adapted to driver and control circuits. Such a PCBA is called an FR4 PCBA. Unlike in the conventional lighting modules, the drive and control circuits on the FR4 PCBA can be closely connected to the IMS PCBA, which allows for space saving in the lighting module, resulting in enhanced compactness. Moreover, the reduced length of the connections allows for enhanced electromagnetic compatibility (EMC) performance.

Further, the first PCBA, which carries light sources, is supported by the heatsink, and is preferentially mounted directly to the heat sink, in order to enhance thermal performance of the lighting module.

The second PCBA may be supported by the heatsink, which allows for the use of the heatsink as a common mechanical reference. The common mechanical reference enhances the assurance that the relative positions of each of the at least one elastic connector and the contact zone allow for ideal elastic deformation of the elastic connector, such that the pressure against the contact zone is enough to ensure contact (especially in automotive vibratory environments), but not too much (which can damage the elastic member, its fixation, or the contact zone).

The invention is particularly well suited to high performance front lighting functions, including high beam, low beam, and segmented high beam functions such as Matrix beam and Pixel beam.

In a non-limiting embodiment of the present invention, reflectors configured for reflecting light emitted from the light sources on any one of the PCBAs are indexed and/or mounted on said PCBA. In particular embodiments, both PCBAs are mounted with such reflectors.

In a non-limiting embodiment of the present invention, at least one of the at least one elastic connector, is a metal tongue with one or more bendings; preferably, each of the at least one elastic connector is a metal tongue with one or more bendings. It is implicit that such bendings are permanent deformations. The one or more bendings ease the assembly of the first PCBA and the second PCBA and ensures a reliable connection between them. Further, the shape of the tongue can be changed to accommodate the different angles between the PCBAs. For instance, the shape of the tongue can be changed to accommodate an angle between −90 degrees to +90 degrees, preferably −45 degrees to 45 degrees, preferably 30 degrees to −30 degrees, between the first PCBA and the second PCBA. Thus, a positioning constraint between the PCBs is lifted, which makes it possible to create less complex mechanical designs, which can be easily assembled.

In a non-limiting embodiment of the present invention, the at least one elastic connector electrically connects the at least one light source on the first PCBA with an electronic circuitry arranged on the second PCBA.

In a non-limiting embodiment of the present invention, the first PCBA and the second PCBA are of different types. In one example, the first PCBA includes an IMS PCB and the second PCBA includes an FR4 PCB. In another example, the first PCBA includes an FR4 PCB and the second PCBA includes an IMS PCB.

In a non-limiting embodiment of the present invention, the first PCBA and the second PCBA are of the same type. In one example, the first PCBA is IMS PCB and the second PCBA is IMS PCB. In another example, the first PCBA includes an FR4 PCB and the second PCBA includes an FR4 PCB.

In a non-limiting embodiment of the present invention, the first PCBA and the second PCBA are horizontally arranged, which is often required for the realisation of a high performance function in a limited space, in particular a high performance lighting function providing a beam with a cutoff, for instance for the realisation of a regulatory low beam function. The elastic connection allows to reduce costs and to enhance the compactness between the horizontally arranged PCBAs in comparison to the conventional solutions a wiring harness. Thus, the elastic connection optimizes the required space for connecting two PCBAs, and hence a compact lighting module can be realized.

In a non-limiting embodiment of the present invention, the one or more reflectors are adapted to reflect the light directly towards an exit lens, which is slanted. The term directly means that the light is not reflected but refracted towards the exit lens. The first PCBA and the second PCBA may be arranged in stairs in order to follow the slant of the exit lens, that is to say that the PCB are arranged on parallel planes on different heights. Preferentially, the PCBs are arranged with null or small overlap (<10% of the PCBA's surface, preferentially <5%). The at least one elastic connector allows to efficiently connect the PCBAs arranged in stairs with minimal bulk and costs, such that the reflectors reflect light from the light source through the slanted exit lens. In this embodiment, the invention allows to efficiently distribute the reflectors along the slanting direction of the exit lens with low bulk and cost.

In a non-limiting embodiment of the present invention, the second PCBA is angled with respect to the first PCBA and extends over the one or more reflectors supported by the first PCBA. The elastic connection ensures reliable and easy connection between the angled PCBAs. The total space required to connect the angled PCBAs using the elastic connectors is less than the space required to connect the angled PCBAs using the wiring harness. Hence, a compact lighting module can be realized when connecting the angled PCBAs using the elastic connectors. In particular, the thermal requirements often dictate that a PCBA is mounted with light sources on one of its faces and positioned directly on a heat sink on its other face. In this situation, it is particularly advantageous to use an angled PCBA connected with the at least one elastic connector, the angle of the PCBA providing enough space for fitting the PCBA just on top of the reflectors associated with the LEDs, the reflectors being preferably indexed directly on the PCBA bearing the associated light sources.

In a non-limiting embodiment of the present invention, the first end of the at least one elastic connector is soldered or welded onto the top side of the first PCBA and the second end of the at least one elastic connector is engaged to the contact zone arranged on the bottom side of the second PCBA. This arrangement requires less space for elastic connection between the PCBAs, and hence ensures to meet space constraints in a compact lighting module. This type of arrangement is useful in lighting modules that have height constraints (height is measured along a vertical axis of the vehicle). For instance, this type of connection requires less space to connect the angled PCBAs, i.e., one PCBA is positioned at an angle with respect to another PCBA. Further, this type of elastic connection ensures reliable connection between the PCBAs as the contact zone is provided underside of the second PCBA.

In another non-limiting embodiment of the present invention, the first end of the at least one elastic connector is soldered or welded onto the top side of the first PCBA and extends through a hole in the first PCBA, to connect the second end of the at least one elastic connector to a contact zone provided on the top side of the second PCBA. For example, in some lighting modules, it may be required to connect two IMS PCBAs mounted with light sources. The elastic connectors are useful to connect two IMS PCBAs while meeting the depth constraints.

In another non-limiting embodiment of the present invention, the first end of the at least one elastic connector is soldered or welded onto the top side of the first PCBA and the second end of the at least one elastic connector is engaged to the contact zone that is arranged on the top side of the second PCBA. Optionally, the at least one elastic connector extends over an edge of the PCB of the first PCBA. This type of arrangement between PCBAs requires even less space for elastic connection compared to the arrangement in which the first PCBA is fixed to a contact zone, which is arranged on the bottom side of the first PCBA. This type of arrangement is useful when the PCBAs are arranged horizontally. In particular, this type of arrangement is useful in lighting modules that have height constraints, for example, thin lighting modules. Further, with this arrangement, compactness between the PCBAs can be reduced and hence advantageous for realizing a compact lighting module.

In a non-limiting embodiment of the present invention, the contact zone and/or the second end of the at least one elastic connector is plated with gold finishing. This gold finishing allows the connection realized by the at least one connector to withstand the friction that is due to vibrations and mechanical stress between PCBAs during the operation of the vehicle.

In a non-limiting embodiment of the present invention, the first PCBA and the second PCBA are connected by a plurality of elastic connectors arranged side by side. By arranging multiple elastic connectors side by side, a greater number of connections between the PCBs can be realized, allowing to connect more complex functions at a reduced cost.

In a non-limiting embodiment of the present invention, the front lighting function includes at least one of a high beam function, a low beam function (that is to say, a function for providing a lighting beam with a horizontal cut-off), a matrix beam function (that is to say, a function for providing a lighting beam with multiple vertical cut-offs), and a pixelated beam function (that is to say, a function for providing a lighting beam with multiple vertical cut-offs and multiple horizontal cut-offs).

In a non-limiting embodiment of the present invention, the invention further comprises a vehicle headlamp comprising the automotive lighting module. The vehicle headlamp may include a housing inside which the module is mounted, preferentially by the means of articulated adjustment mechanisms. Thus, high performance functions can be realized with sufficient angular precision with respect to the surface of the road, whatever the conditions affecting the vehicle pitch, in particular load conditions.

As can be understood from the aforementioned embodiments, the elastic connection between PCBAs consumes minimum space and is less expensive and less complex, in particular less complex to assemble. Thereby, the elastic connection between the PCBAs enables a compact and economic design for high performance lighting modules.

BRIEF DESCRIPTION OF THE DRAWINGS

To complete the description and to provide a better understanding of the invention, a set of drawings is provided. Said drawings form an integral part of the description and illustrate an embodiment of the invention, which should not be construed as restricting the scope of the invention, but only as an example of how the invention can be carried out. The drawings comprise the following characteristics.

DETAILED DESCRIPTION OF THE INVENTION

Figure 1:
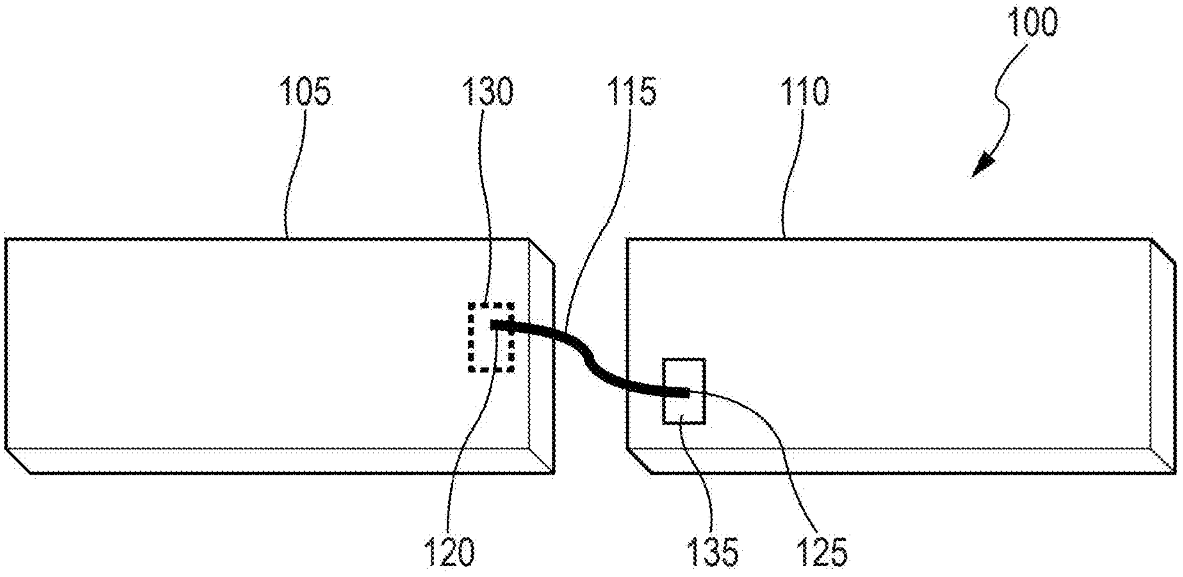
FIG. 1 illustrates a first PCBA interconnected with a second PCBA by an elastic connector, according to an embodiment of the present invention.

Embodiments of the present application will below be explained in details by ways of examples with reference to the accompanying drawings. Throughout the description, same or similar reference numerals represent same or similar parts. The following description of the embodiments with reference to the drawings is intended to explain the general inventive concept of the present application, instead of limiting it to the present invention.

In the following detailed description, for purposes of explanation, numerous specific details are set forth in order to provide a thorough understanding of the disclosed embodiments. It will be apparent, however, that one or more embodiments may be practiced without these specific details.

Embodiments of the present invention are directed to an automotive lighting module. In particular, the embodiments of the present invention are directed to interconnection of PCB assemblies and an automotive lighting module, which incorporates the interconnected PCB assemblies. Embodiments of the present invention eliminate the need for wiring harness and conventional connectors, and still provide a mechanical and electrical interconnection between the PCBAs, while meeting thermal, optical, and Electromagnetic Compatibility (EMC) constraints.

According to an embodiment, the present invention is directed to an automotive lighting module that can perform front lighting functions. By way of example, and not limited to, the front lighting functions include at least low beam function, high beam function, matrix beam and pixel beam functions etc. Although the present embodiments are discussed with respect to the automotive lighting modules that perform front lighting functions, it should be noted that the present invention can be applied to the automotive lighting/signaling modules which perform other lighting/signaling functions that are known to a person skilled in the art.

The automotive lighting module comprises: at least a first PCBA mounted with at least one light source; a heat sink adapted to dissipate heat generated by at least one light source; and at least a second PCBA. At least the first PCBA and/or at least the second PCBA is supported by the heat sink. The lighting module further comprises one or more reflectors arranged to reflect the light emitted by at least one light source. In a preferred embodiment, the one or more reflectors are non-TIR type reflectors, that allow for a higher performance. In another example, the one or more reflectors are TIR-type reflectors. The light reflected by the reflectors contributes to the front lighting function(s). The reflectors reflect light so that a direction of maximal intensity of the reflected light makes an angle inferior to 45, preferentially 30, preferentially 15, preferentially 5 degrees with the plane of the PCBA. The first PCBA and the second PCBA are electrically connected by means of an elastic connector.

FIG. 1 illustrates a first PCBA interconnected with a second PCBA by an elastic connector, according to an embodiment of the present invention. The PCB interconnection assembly 100 of a non-limiting embodiment comprises a first PCBA 105, a second PCBA 110, and an elastic connector 115 interconnecting the first PCBA 105 and the second PCBA 110. Although not shown in the FIG. 1, it is understood that the first PCBA 105 and the second PCBA 110 may be disposed with one or more electronic components. For instance, one or more light sources, (for instance, Light Emitting Diodes, also known as LEDs) may be provided on the top face of the first PCBA 105; and control circuitry to drive the one or more light sources may be provided on the top face of the second PCBA 110. Those of ordinary skill in the art will appreciate that the light sources may comprise other types of light sources than those described herein. The elastic connector 115 is elastically deformable. It is a metal tongue with one or more bendings.

Figure 2A:
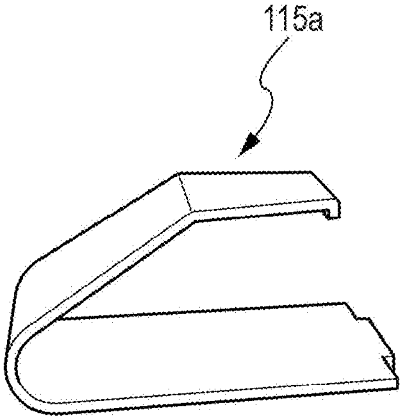
FIG. 2*a*, FIG. 2*b*, and FIG. 2*c* illustrate different shapes of elastic connectors, which can be used between the first PCBA and the second PCBA shown in the FIG. 1.
Figure 2B:
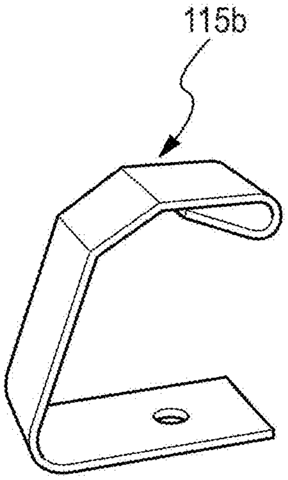
Figure 2C:
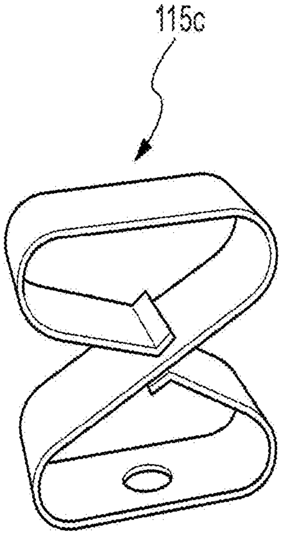

Without limitation, exemplary elastic connectors 115*a*, 115*b*, and 115*c* are shown in the FIG. 2*a*, FIG. 2*b*, and FIG. 2*c*, respectively. The elastic connectors 115 includes a first end 120 and a second end 125 opposite to the first end 120. The elastic connectors 115 is elastically deformable, where the first end 120 (shown in FIG. 1) of the elastic connector 115 is fixed to the first PCBA 105 on a solder pad 130 arranged on the top face of the first PCBA 105, and a second end 125 (shown in FIG. 1) is adapted to be pressed against a contact zone 135 of the second PCBA 110 by elastic deformation of the elastic connector 115, to engage the second end 125 to the contact zone 125 to establish the electrical and physical connection between the first PCBA 105 and the second PCBA 110. In particular, during the assembly, by positioning the first PCBA 105 with respect to the second PCBA 110, a certain amount of pressure would be created on the elastic connector 115 and this result in creating elastic deformation of the elastic connector 115. This elastic deformation results in automatic engagement of the first PCBA 105 with the second PCBA 110. Thus, the present invention automates the assembly process of interconnecting PCBAs. Further, the shape of the tongue can be dimensioned to accommodate the different angles between the PCBAs 105, 110. By way of an example, and not the limitation, the shape of the tongue can be dimensioned to accommodate an angle comprised between −90 degrees and +90 degrees, between the first PCBA 105 and the second PCBA 110.

Although a single elastic connector 115 is shown in the FIG. 1 connecting the first PCBA 105 and the second PCBA 110, it is understood that the first PCBA 105 and the second PCBA 110 can be connected by a plurality of elastic connectors arranged side by side. By arranging the plurality of elastic connectors side by side, a highly reliable electrical connection between the PCBAs 105, 110 can be realized. In an example, the number of elastic connectors 115 are at least three so as to allow for one LED power supply connection, a ground connection, and a connection for transmission of data from the LED regarding parameters such as LED BIN and/or LED temperature.

In an aspect, the contact zone 135 and/or the second end 125 of the elastic connector is plated with gold finishing. This gold finishing ensures to withstand vibrations and mechanical stress between PCBAs 105, 110 during the operation of the vehicle. It is to be understood that the second end 125 of the elastic connector 115 and/or the contact zone 135 may be plated with other suitable material that allows it to withstand vibrations and mechanical stress between PCBAs 105, 110 during the operation of the vehicle.

In a non-limiting embodiment of the present invention, the first PCBA 105 and the second PCBA 110 are of same type PCBs. In another non-limiting embodiment of the present invention, the first PCBA 105 and the second PCBA 110 are of different type PCBs.

In one example, the first PCBA 105 is IMS PCB and the second PCBA 110 is FR4 PCB. In another example, the first PCBA 105 is FR4 PCB and the second PCBA 110 is IMS PCB. For high performance lighting modules, it is advantageous to provide high power light sources on the IMS PCB and the corresponding drive and control circuitry on the FR4 PCB to improve the heat dissipation performance and/or optical performance of the automotive lighting module.

Yet, in another example, the first PCBA 105 is FR4 PCB and the second PCBA 110 is FR4 PCB. Further, in another example, the first PCBA 105 is IMS PCB and the second PCBA 110 is IMS PCB. Although the present embodiments are discussed with regard to interconnection of two PCBAs, however it is understood to a person skilled in that multiple PCBAs can be interconnected by using one or more elastic connectors.

In lighting modules of automotive vehicles, PCBAs are generally supported on a heat sink (not shown in FIG. 1). The heat sink may be adapted to dissipate heat generated by light sources. The heat sink may be monobloc or a heat sink assembly made of heat sink parts. In one example, the PCBAs 115, 110 are mounted on different heat sink parts. In another example, at least one PCBA is mounted on the heat sink.

According to present invention, there are several ways to interconnect the first PCBA 105 and the second PCBA 110 by using the elastic connector 115. For the purpose of understanding, three different non-limiting embodiments of interconnecting the first PCBA 105 and the second PCBA 110 are discussed herein.

Figure 3:
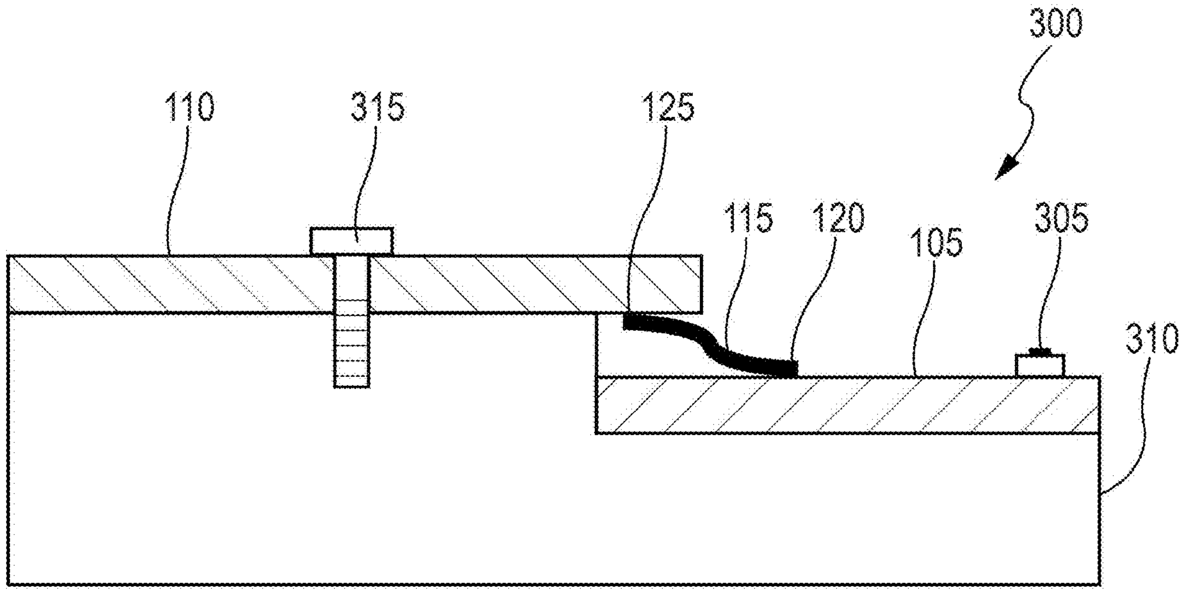
FIG. 3 is a side view of a PCBA's interconnection assembly, according to one embodiment of the present invention.

One non-limiting embodiment of PCB interconnecting assembly 300 is shown in FIG. 3. As can be seen in the FIG. 3, the first end 120 of the elastic connector 115 is soldered or welded onto one of solder pads arranged on the top side of the first PCBA 105 and the second end 125 of the elastic connector 115 is engaged to the contact zone arranged on the bottom side of the second PCBA 110. In this embodiment, the first PCBA 115 is IMS PCB which accommodates one or more light sources 305 as shown in FIG. 3. As can be seen from the FIG. 3, the second PCBA 110 is secured to a base of a heat sink assembly 310 by a fastening means 315. During the assembly of the fastening means 315 to the second PCBA 110, a certain amount of pressure would be created on the elastic connector 115 thereby resulting in an elastic deformation of the elastic connector 115. The elastic deformation eases and maintains electrical connection of the second end 125 of the elastic connector 115 to the contact zone arranged on the bottom side of the second PCBA 110. In particular, it is possible to automatize the connection. This arrangement requires less space for elastic connection between the PCBAs 105, 110, and hence ensures to meet space constraints in compact lighting modules. This type of arrangement is useful in lighting modules with height constraints and without depth constraints. Further, this type of arrangement may be useful when one PCBA is positioned at an angle with respect to another PCBA. In addition, this type of elastic connection ensures reliable connection between the PCBAs 105, 110 as the contact zone is provided underside of the second PCBA 110.

Figure 4A:
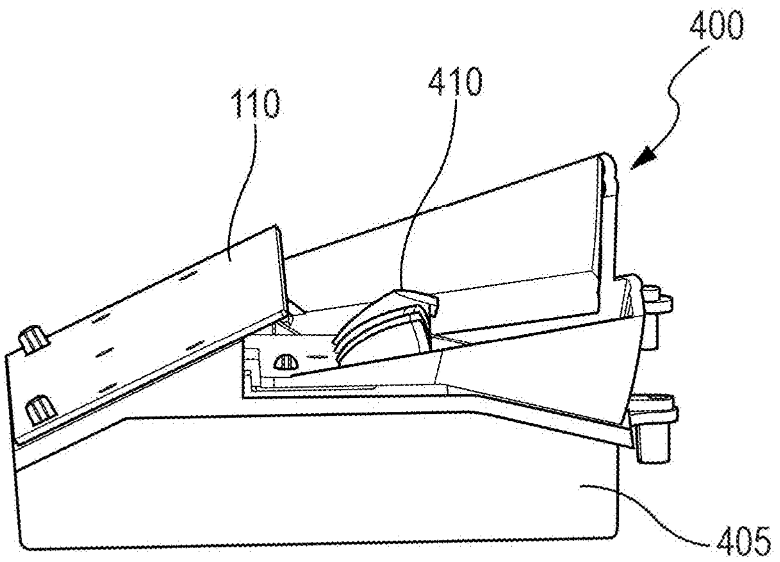
FIG. 4*a* is a diagram illustrating an exemplary lighting module of a motor vehicle, in which a first PCBA and a second PCBA are connected by using an elastic connector, according to an embodiment of the present invention.
Figure 4B:
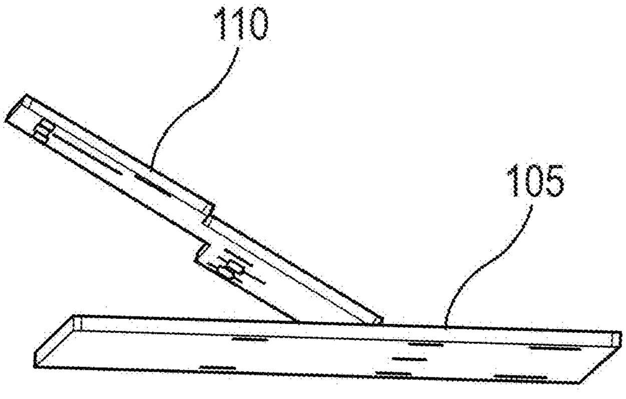
FIG. 4*b* illustrates a PCBA interconnection assembly employed in the exemplary lighting module shown in the FIG. 4*a*, according to an embodiment of the present invention.

With reference to FIG. 4*a*, an exemplary lighting module 400 in which the angled PCBAs are interconnected by using an elastic connector is shown, according to one preferred embodiment of the invention. Further, the FIG. 4*b* illustrates angled PCBAs connected by an elastic connector. As can be seen in the FIG. 4*a*, the exemplary lighting module 400 includes a heat sink assembly 405, one or more reflectors 410 and a PCB interconnect assembly, which is clearly depicted in the FIG. 4*b*. In this type of module, a beam originating from the light sources is first reflected on a primary reflector, towards a secondary reflector that then projects it through a lens of a vehicle headlight, towards an exterior of the headlight.

As can be seen from the FIG. 4*b*, the first PCBA 105 is positioned horizontally. In this embodiment, the first PCBA 105 includes an IMS PCB. The first PCBA 105 is in direct contact with the heat sink 405, thus, heat dissipation performance can be improved. Further, the one or more reflectors 410 are positioned directly over the light sources mounted on the first PCBA. This ensures to improve the optical performance as the one or more reflectors 410 can be positioned accurately over the light sources, and hence results in improving optical performance. Further, the second PCBA 110 holds the driver circuitry is angled with respect to the first PCBA 105, and extends over the one or more reflectors 410, which are at least partially supported by the first PCBA 105. This disposition of the second PCBA 110 with respect to the first PCBA 105 allows to reduce the depth of the lighting module assembly. In addition by positioning the drive and control circuits on the second PCBA (for instance, FR4 PCB), the EMC performance can be enhanced. Thus, the angled connection of the PCBAs is realized by the elastic connector 115 and the angled connection of PCBAs ensures to provide a high performance compact lighting module, while meeting the thermal constraints and space constraints.

Figure 5:
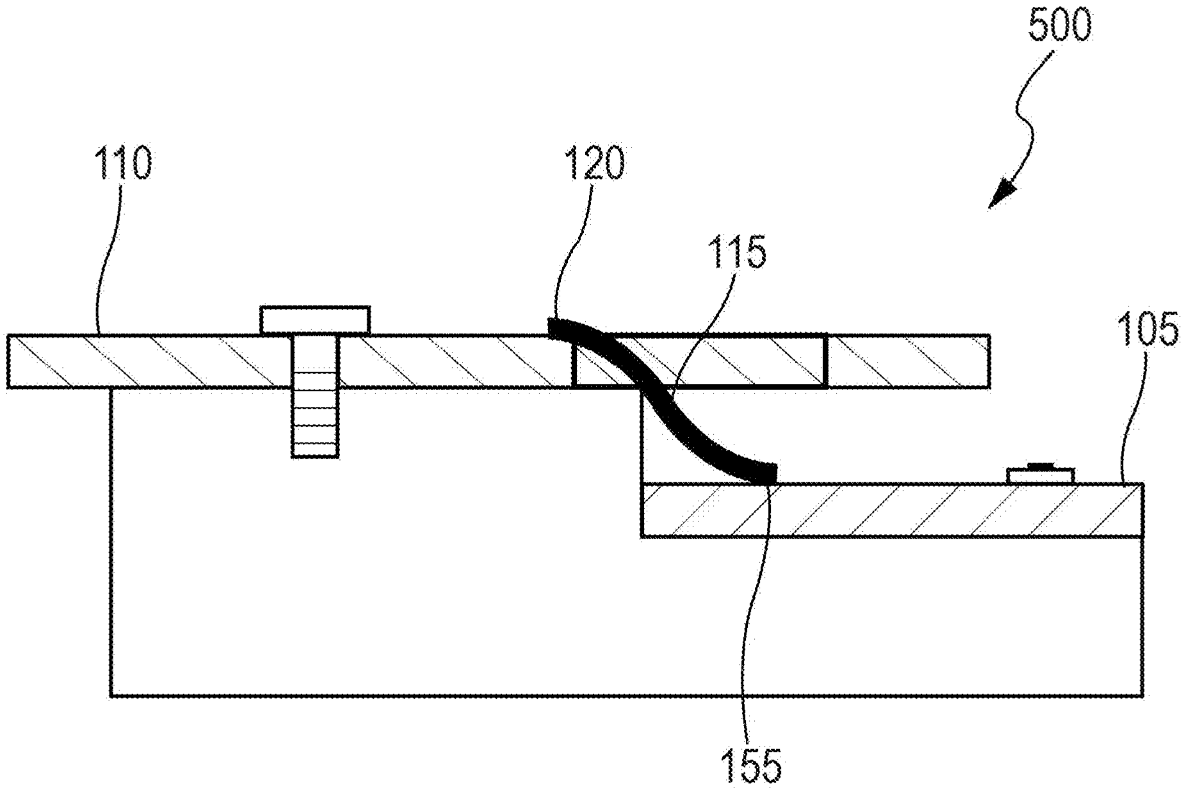
FIG. 5 is a side view of a PCBA's interconnection assembly, according to another embodiment of the present invention.

Another non-limiting embodiment of PCB interconnection assembly 500 is shown in FIG. 5 As can be seen in the FIG. 5, the first end 120 of the elastic connector 115 is soldered or welded onto a solder pad arranged on a top side of the second PCBA 110 and the second end of the elastic connector 115 extends through a hole in the second PCBA 110 to connect the second end 125 of the elastic connector to a contact zone provided on the top side of the first PCBA 105. This type of connection is advantageous when the second PCBA 110 is of longer length compared to the length of the first PCBA 105. This type of arrangement is useful when both the PCBAs are of the same type and when the lighting module has depth constraints. For example, in some lighting modules, it is required to connect two IMS PCBAs on which light sources have to be mounted. In such cases, this type of connection is useful to connect two IMS PCBAs while meeting the depth constraints.

Figure 6:
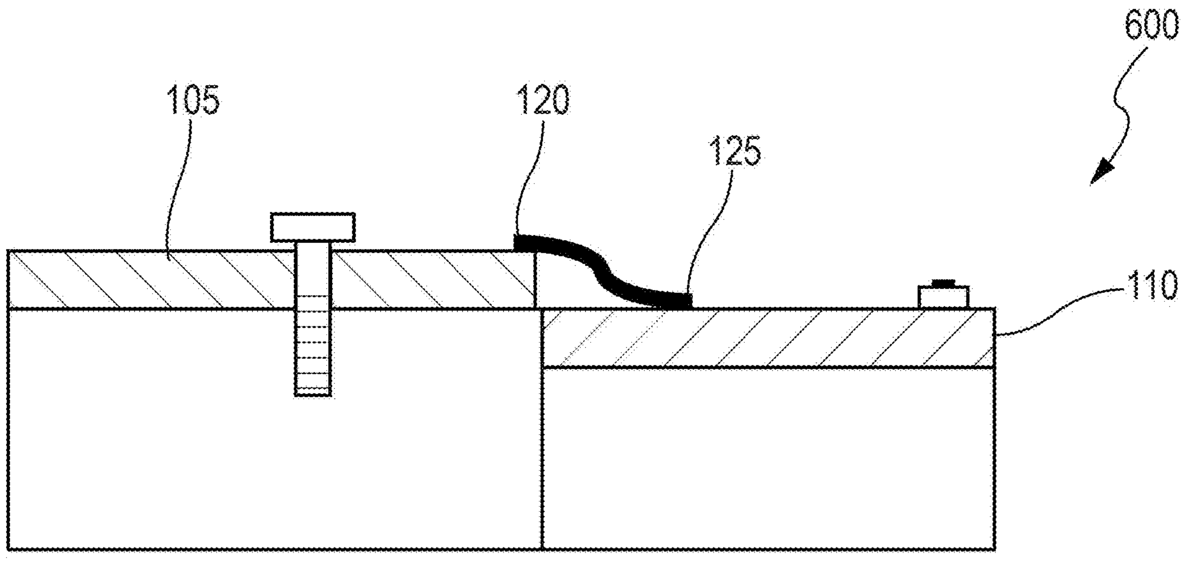
FIG. 6 is a side view of PCBA's interconnection assembly, according to another embodiment of the present invention.
Figure 7:
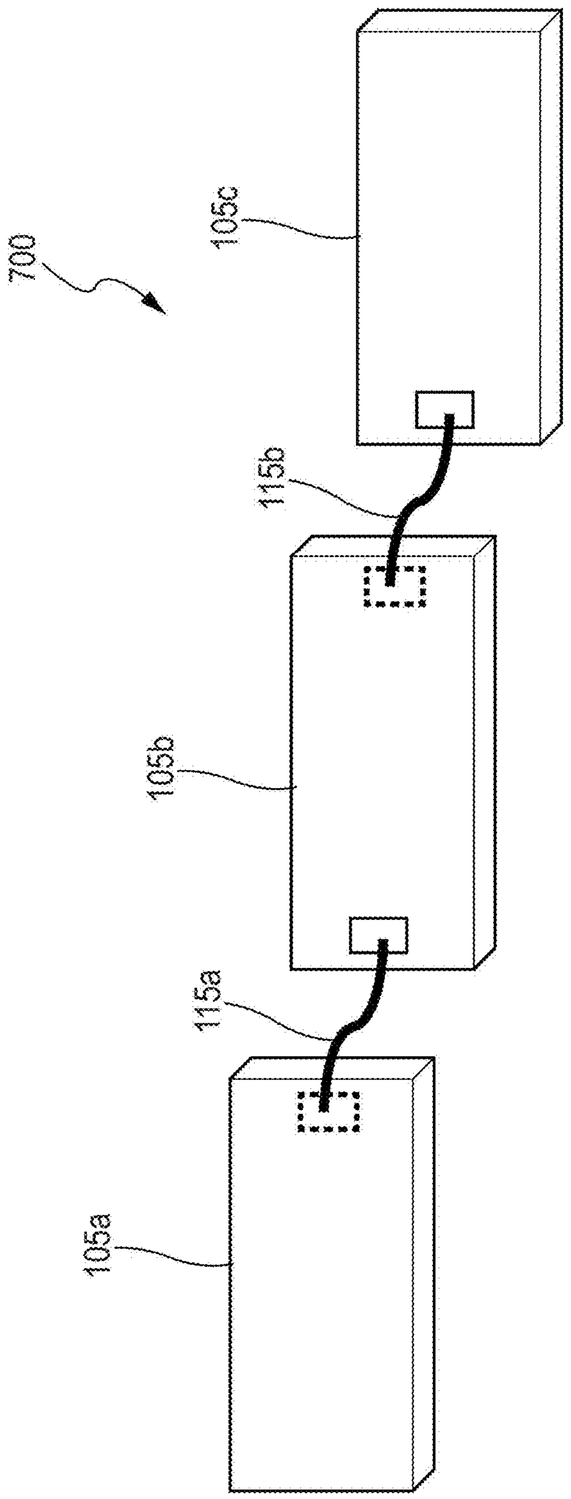
FIG. 7 illustrates horizontal PCBAs interconnection assembly, according to an embodiment of the present invention.

Another non-limiting embodiment of PCB interconnect assembly 600 is shown in FIG. 6. As can be seen in the FIG. 6, the first end 120 of the elastic connector 115 is soldered or welded on the top side of the first PCBA 105 and the second end 125 of the elastic connector 115 is engaged to the contact zone arranged on the top side of the second PCBA 110. This type of arrangement between PCBAs 105, 110 requires further less space for elastic connection compared to the arrangement shown in the embodiment 300. This type of arrangement is useful when the PCBAs 105*a*, 105*b*, 105*c* are required to be arranged horizontally as shown in the FIG. 7. In particular, this type of arrangement is useful in lighting modules which have height constraints, for example, thin lighting modules. Further, with this arrangement, compactness between the PCBAs 105, 110 is enhanced and hence advantageous for realizing a compact lighting module.

Figure 8:
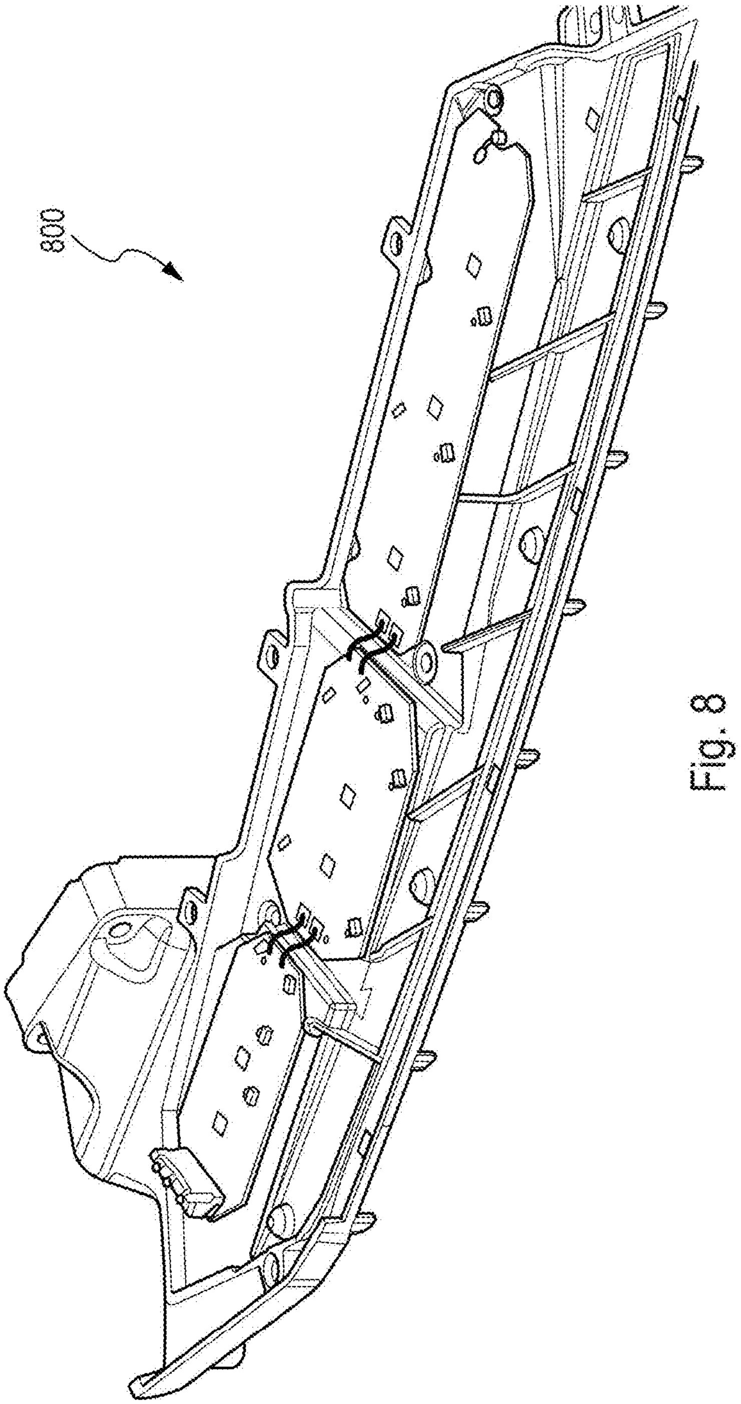
FIG. 8 is a diagram illustrating an exemplary lighting module of a motor vehicle, in which horizontal PCBAs are connected by using an elastic connector, according to an embodiment of the present invention.

An exemplary lighting module according to another preferred embodiment is shown in the FIG. 8. In this exemplary lighting module, one or more reflectors (not shown in the Figures) is adapted to reflect the light towards an exit lens (not shown in the Figures), which is slanted. As the one or more reflectors is adapted to reflect light to perform high performance front lighting functions, in particular functions providing a beam with a horizontal cut-off, a horizontal orientation has to be kept for the PCBAs. In such cases, it is required to arrange in stairs so as to follow the slant of the exit lens; for instance, the PCBAs may be laid out along an axis transversal to the main driving direction. The horizontally arranged PCBAs 105*a*, 105*b*, 105*c* are interconnected by elastic connectors 115*a*, 115*b* as shown in the FIG. 7, and this arrangement may result in reducing cost and saving space taken by the wire harness.

In accordance with another embodiment, the present invention is related to a vehicle headlamp comprising one or more of the exemplary lighting modules.

Thus, the embodiments of the present invention provide an automotive lighting module in which PCBs are interconnected by a mechanism which eliminates the need for wiring harness and conventional connectors, and still provide a mechanical and electrical interconnection between the PCBs, while meeting thermal constraints, optical constraints, as well as EMC constraints.

What is claimed is:

1. An automotive lighting module able to perform a front lighting function, the automotive lighting module comprising:

a first printed circuit board assembly (PCBA) mounted with a light source;

a heat sink adapted to dissipate heat generated by the light source;

a second PCBA, wherein the first PCBA is supported by the heat sink;

one or more reflectors arranged to reflect light emitted by the light source;

wherein the first PCBA and the second PCBA are interconnected by an elastic connector that is elastically deformable, the elastic connector including a first end and a second end opposing the first end, wherein the elastic connector is formed from a metal tongue with a plurality of bendings along a length of the metal tongue to form the metal tongue into a shape of a figure-8 profile; wherein the first end is fixed to the first PCBA or the second PCBA; and the second end is adapted to be pressed against a contact zone of the second PCBA or the first PCBA, respectively, by an elastic deformation of the elastic connector, so as to engage the second end to the contact zone and, thereby, establishing a connection between the first PCBA and the second PCBA.

2. The automotive lighting module of claim 1, wherein the elastic connector (115) is a metal tongue with one or more bendings.

3. The automotive lighting module of claim 1, wherein the elastic connector electrically connects the at least one-light source on the first PCBA with an electronic circuitry arranged on the second PCBA.

4. The automotive lighting module of claim 1, wherein the first PCBA is an Insulated Metal Substrate (IMS) PCBA and the second PCBA is a Flame Retardant glass fiber epoxy (FR4) PCBA.

5. The automotive lighting module of claim 1, wherein the second PCBA is at least partially supported by the heatsink.

6. The automotive lighting module of claim 1, wherein the first PCBA and the second PCBA are arranged horizontally.

7. The automotive lighting module of claim 1, wherein the second PCBA is angled with respect to the first PCBA and extends over the one or more reflectors, which are at least partially supported by the first PCBA.

8. The automotive lighting module of claim 1, wherein the first end of the elastic connector is soldered or welded onto a top side of the first PCBA and the second end of the elastic connector is engaged to the contact zone arranged on a bottom side of the second PCBA.

9. The automotive lighting module of claim 1, wherein the first end of the elastic connector is soldered or welded onto the top side of the second PCBA and extends through a hole the first PCBA to connect the second end of the elastic connector to the top side of the first PCBA.

10. The automotive lighting module of claim 1, wherein the first end of the elastic connector is soldered or welded on a top side of the first PCBA and the second end of the elastic connector is engaged to the contact zone arranged on a top side of the second PCBA.

11. The automotive lighting module of claim 1, wherein the contact zone or the second end of the elastic connector is plated with gold finishing.

12. The automotive lighting module of claim 1, wherein the first PCBA and the second PCBA are connected by a plurality of elastic connectors arranged side-by-side.

13. A vehicle headlamp comprising
an automotive lighting module including
a first printed circuit board assembly (PCBA) mounted with a light source;
a heat sink adapted to dissipate heat generated by the light source;
a second PCBA, wherein at least the first PCBA is supported by the heat sink;
a reflector arranged to reflect light emitted by the light source;
wherein the first PCBA and the second PCBA are interconnected by an elastic connector including a first end and a second end opposing the first end, the elastic connector being elastically deformable, wherein the elastic connector is formed from a metal tongue with a plurality of bendings along a length of the metal tongue to form the metal tongue into a shape of a figure-8 profile;
wherein the first end is fixed to the first PCBA or the second PCBA; and
the second end is adapted to be pressed against a contact zone of the second PCBA or the first PCBA, respectively, by an elastic deformation of the elastic connector; so as to engage the second end to the contact zone; and thereby, establishes a connection between the first PCBA and the second PCBA.

14. The vehicle headlamp of claim 13, wherein the reflector is adapted to reflect the light directly towards an exit lens, which has a slant.

15. The vehicle headlamp of claim 14, wherein the first PCBA and the second PCBA are arranged in stairs so as to follow the slant of the exit lens, and wherein the second PCBA is mounted with at least one of the light source.

* * * * *